United States Patent
Hrovat et al.

(10) Patent No.: US 6,651,761 B1
(45) Date of Patent: Nov. 25, 2003

(54) TEMPERATURE CONTROL SYSTEM FOR FUEL CELL ELECTRIC VEHICLE COOLING CIRCUIT

(75) Inventors: Davorin David Hrovat, Ann Arbor, MI (US); Jahanbakhsh Asgari, Dearborn, MI (US); Josko Deur, Zagreb (HR); William Samuel Schwartz, Pleasant Ridge, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,400

(22) Filed: Apr. 18, 2002

(65) Prior Publication Data (65)

Related U.S. Application Data (60) Provisional application No. 60/325,281, filed on Sep. 27, 2001.

(51) Int. Cl.⁷ .................................. B60K 1/00
(52) U.S. Cl. ..................... 180/65.3; 429/24; 165/41
(58) Field of Search .................. 429/24, 26; 180/65.1, 180/65.2, 65.3; 165/41, 42, 43; 123/41.12, 41.49

(56) References Cited

U.S. PATENT DOCUMENTS

| | | | |
|---|---|---|---|
| 3,935,028 A | | 1/1976 | Strasser et al. |
| 4,546,742 A | * | 10/1985 | Sturges .................. 123/41.05 |
| 4,650,729 A | | 3/1987 | Nakamura et al. |
| 5,248,566 A | | 9/1993 | Kumar et al. |
| 5,482,790 A | | 1/1996 | Yamada et al. |
| 6,087,028 A | * | 7/2000 | Goto ...................... 429/24 |
| 6,093,500 A | | 7/2000 | Margiott et al. |
| 6,186,254 B1 | * | 2/2001 | Mufford et al. .......... 180/65.3 |
| 6,232,006 B1 | | 5/2001 | Breault |
| 6,360,835 B1 | * | 3/2002 | Skala ..................... 180/65.2 |
| 6,383,672 B1 | * | 5/2002 | Fujita .................... 429/26 |
| 6,394,207 B1 | * | 5/2002 | Skala ..................... 180/65.2 |
| 6,448,535 B1 | * | 9/2002 | Ap ........................ 219/208 |
| 6,450,275 B1 | * | 9/2002 | Gabriel et al. .......... 180/65.4 |
| 2001/0050191 A1 | | 12/2001 | Ogawa et al. |

OTHER PUBLICATIONS

Kami Buchholz, "Cool Visteon Product Benefits," *Automotive Engineering International*, Aug. 2001, vol. 109, No. 8, SAE, Warrendale, PA.

* cited by examiner

Primary Examiner—Brian L. Johnson
Assistant Examiner—Brian Swenson
(74) Attorney, Agent, or Firm—Tung & Associates; Carlos L. Hanze (57) ABSTRACT

A system and method to control the coolant temperature of two independent cooling loops of a fuel cell vehicle by adjusting system pump speed, fan speed and radiator bypass valve position. Multiple feedback controllers coordinated by robust flip-flop logic are used, to minimize energy consumption and provide optimal control system performance even in the case of substantially different plant responses with respect to fan speed and valve position plant inputs. The system also includes a feed forward disturbance compensator, which reacts immediately to change in net power and vehicle speed disturbance variables, thereby reducing the variance of the temperature control error. Additionally, a feedback controller preset strategy is used to compensate for distinctive plant nonlinear effects such as bypass valve dead-zone and air-conditioning system's request for abrupt change of fan speed.

43 Claims, 5 Drawing Sheets

TEMPERATURE CONTROL SYSTEM FOR FUEL CELL ELECTRIC VEHICLE COOLING CIRCUIT

CROSS REFERENCE TO RELATED APPLICATIONS

This application claims priority to a provisional patent application serial No. 60/325281 titled, "Temperature Control System for Fuel Cell Electric Vehicle Cooling Circuit," filed Sep. 27, 2001. The entire disclosure of serial No. 60/325281 is incorporated herein by reference in its entirety.

BACKGROUND OF INVENTION

The present invention relates generally to vehicle temperature control systems and specifically to a temperature control system for a fuel cell vehicle.

In an effort to find new energy sources, fuel cells using an electrochemical reaction to generate electricity are becoming an attractive energy alternative. Fuel cells offer low emissions, high fuel energy, conversion efficiencies, and low levels of noise and vibration. U.S. Pat. No. 5,248,566 to Kumar et al. These advantages make fuel cells useful in automotive applications. Of the various types of fuel cells, the proton electrolyte membrane (PEM) fuel cell appears to be the most suitable for use in automobiles, as it can produce potentially high levels of energy, but has low weight and volume.

Fuel cells, while simple in concept, are quite complex since many systems need to be considered to operate the fuel cell optimally. One of the design challenges of a vehicle with a PEM fuel cell stack is the high volume of heat it produces while in operation. Thermal management systems (cooling systems) are known for conventional internal combustion engine (ICE) vehicles. Unfortunately, fuel cell powered vehicles have unique thermal management requirements when compared to ICE vehicles. One of these requirements is that the aqueous-based coolant must be maintained at a specific temperature at the fuel cell stack inlet. At the same time, the inlet temperature of a separate, so-called low temperature cooling circuit must be limited to a specific temperature. Further, a temperature rise of the coolant across the stack needs to be maintained at a precise value. These requirements are needed to maintain the correct fuel cell stack efficiency and humidification that in turn effect the performance and durability of the stack.

Fuel cell thermal management systems are known in the art, but none appear to have dual controls for coolant temperature. A new fuel cell cooling system control strategy needs to be developed to address the deficiencies of the prior art. This new thermal management system for the fuel cell should include a cooling circuit with variable fan speed control and flow control actuators such as a radiator bypass valve, to deliver the precise temperature controls needed.

SUMMARY OF INVENTION

Accordingly, the present invention is a system and method to control coolant temperature within a fuel cell vehicle. Coolant inlet temperature is controlled by adjusting system fan speed and a radiator bypass valve position. For this invention, a general control solution with independent controllers for fan and bypass valve operating modes is proposed. The controllers can have different parameters and structures so they can provide better control performance for significantly different plant responses with respect to fan speed and bypass valve position plant inputs. For this invention, a plant involves what the controller is trying to control. The controllers are subsequently activated using simple and robust coordination logic. An additional control and coordination algorithm that provides limitation of the inlet temperature for the low temperature cooling circuit extends this control approach.

Further, inlet temperature control error is highly influenced by change of the net power and vehicle speed disturbance variables. The controller is extended by a feed-forward disturbance compensator, to mitigate the influence of the disturbances to improve the control system's performance. This improves performance in that rather than reacting to changes in coolant temperature, the controller is able to anticipate these changes before they occur. Gain scheduling is used to improve the performance of the feed-forward compensator that includes dependence on ambient temperature.

Further, fuel cell stack behavior in one mode (in which the fuel cell coolant inlet temperature is controlled by the operation of a radiator bypass valve) is characterized by a distinctive dead-zone nonlinearity, especially at low vehicle speeds. This dead-zone effect results in a large inlet coolant temperature dynamic control error during a significant portion of the radiator bypass valve's operation. Another disturbance effect is also caused by the abrupt change of fan speed requested from air-conditioning (A/C and cooling systems use the same fan for working fluid pressure and/or temperature control). The control strategy is extended by a controller-preset algorithm that efficiently compensates for the valve operation nonlinear effects and for A/C fan operation disturbance effects.

Other objects of the present invention will become more apparent to persons having ordinary skill in the art to which the present invention pertains from the following description taken in conjunction with the accompanying figures.

BRIEF DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

The present invention relates to fuel cell powered vehicles and their unique thermal management requirements (temperature control) when compared to conventional internal combustion engine (ICE) vehicles. The present invention coordinates management of a cooling system used to control the temperature of a fuel cell stack, the temperature of its accessories, and the cooling airflow for the air-conditioning (AC) system. Temperature control is needed to maintain correct fuel cell stack efficiency and humidification. These have dramatic effects on the performance and durability of the stack.

The temperature control strategy of the present invention delivers the precise temperature controls needed for a fuel cell powered vehicle. This control system has been designed based on transient and steady-state analyses and linearization of the cooling circuit mathematical model, and has been verified by computer simulation for different operating cycles and conditions.

Figure 1:
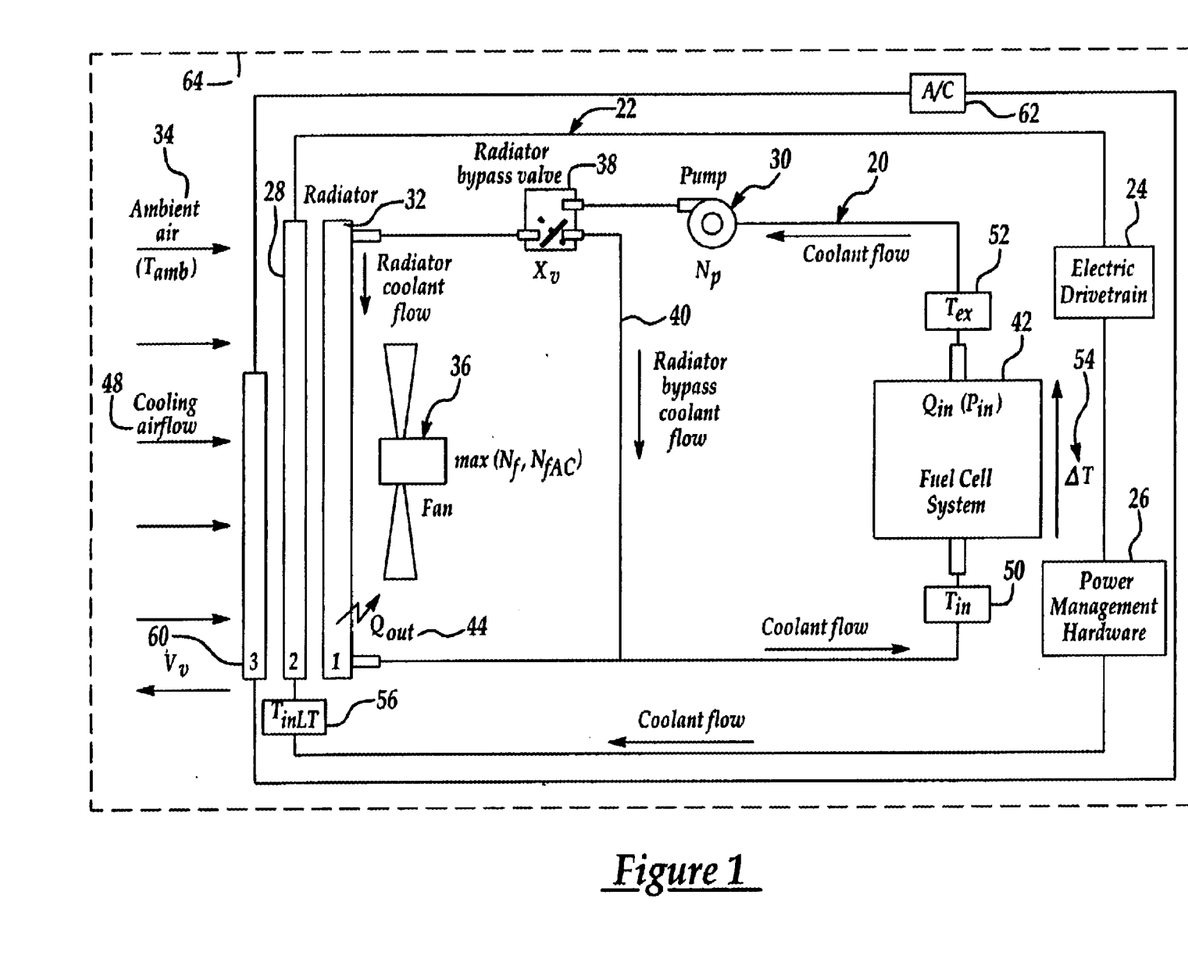
FIG. 1 illustrates a functional schematic of the fuel cell electric vehicle cooling circuit of the present invention.

FIG. 1 shows a functional schematic of a fuel cell vehicle cooling circuit of the present invention. Two independent cooling circuits (loops) are used to cool a fuel cell system 42 and all other liquid cooled components on the vehicle. They include a high temperature cooling loop 20 and a low temperature cooling loop 22. The fuel cell stack and several associated system components can be cooled with the high temperature cooling loop 20. Coolant is fed from the conduit into the fuel cell system 42 through an inlet and exits out of the fuel cell system 42 through an outlet. This illustrated and simplified high temperature cooling loop 20 is provided to assist in the understanding of the present invention. The low temperature cooling loop 22 has a low temperature cooling loop heat exchanger also known in the art as a radiator ("low temperature cooling loop radiator") 28 with an inlet and an outlet to allow exit and entry of coolant and can be used to thermally manage some auxiliary vehicle components such as auxiliary fuel cell system 42 components, an electric drivetrain 24 and its power management hardware 26. The low temperature cooling loop 22 can also have a pump (not shown) to move coolant through a plurality of conduits from the low temperature cooling loop radiator 28 and through the various cooled components.

On the high temperature cooling loop 20, fuel cell system 42 waste heat ($Q_{in}$) is removed by coolant (not shown) and transported through the loop via several conduit means (as illustrated in FIG. 1) such as hoses, piping, etc. through the action of a variable speed pump 30 to a high temperature cooling loop heat exchanger also known in the art as a radiator ("high temperature cooling loop radiator") 32 having an inlet and an outlet and/or a radiator bypass 40, where it is removed from the vehicle ($Q_{out}$) 44 by a cooling airflow 48. The cooling airflow 48 varies based on vehicle speed and ambient air temperature 34 ($T_{amb}$), and can be increased by the action of a fan 36. The fan 36 for the present invention has variable speeds. The flow of coolant is also controlled by a variable high temperature cooling loop radiator bypass valve 38. This bypass valve 38 controls the amount of coolant flow between the high temperature cooling loop radiator 32 and the high temperature cooling loop radiator bypass 40.

In one embodiment of the present invention, the temperature control requirements are: (i) a high temperature cooling loop fuel cell system inlet temperature ($T_{in}$) 50 should be approximately within ±2 degrees Celsius from a target temperature of 70 degrees Celsius at all times, (ii) coolant temperature rise across the fuel cell system 42 (i.e., $T_{ex}$ 52 minus $T_{in}$ 50=$\Delta T$ 54) should be as close to 10 degrees Celsius as possible, and (iii) a low temperature cooling loop inlet temperature ($T_{inLT}$) 56 should be lower than 50 degrees Celsius.

Inlet temperatures $T_{in}$ 50 and $T_{inLT}$ 56 are controlled by adjusting the fan 36 speed ($N_f$) and the bypass valve 38 position ($X_v$). The coolant temperature rise ($\Delta T$) 54 is controlled by adjusting coolant mass flow through adjustment of the high temperature cooling loop pump 30 speed ($N_p$). All the commanded variables $N_f$, $X_v$ and $N_p$ are given in a normalized form. They change in the range from 0 to 1, where 0 corresponds to zero fan 36 or pump 30 speed and fully closed bypass valve 38 (i.e., full bypass operation), and 1 corresponds to the rated fan 36 or pump 30 speed and fully opened bypass valve 38 (i.e., no bypass operation).

The fuel cell system 42 main plant disturbances are: fuel cell system output power (approximately proportional to net power $P_n$), vehicle speed ($V_v$), and the ambient temperature $T_{amb}$ 34. The first disturbance ($P_n$) influences fuel cell system waste heat $Q_{in}$, while the last two ($V_v$ and $T_{amb}$) influence the heat $Q_{out}$ 44 removed by the cooling airflow 48. The plant of the present invention refers to what the controllers are trying to control.

In the illustrated embodiment of the present invention, fan 36 is also used by an air-conditioning (A/C) system 62 to cool an A/C condenser 60. The A/C system 62 can command stepwise changes of the fan 36 speed ($N_{fAC}$) to a few distinct levels. However, an A/C system control unit (not shown) can work independently of the fuel cell system 42 temperature control of the present invention. A final fan 36 speed command is selected as a maximum value of the A/C system 62 and fuel cell system 42 commanded variables $N_{fAC}$ and $N_f$, respectively. Hence, the change of the A/C system 62 commanded speed to a level $N_{fAC}>N_f$ can be regarded as an external disturbance action, which increases the inlet coolant temperature dynamic control error.

In summary, the present invention as illustrated in FIG. 1 can have the following:

[t1]
Controlled Variables

| | |
|---|---|
| $T_{in}$ | inlet temperature of high temperature cooling loop |
| $\Delta T$ | temperature rise across fuel cell system |
| $T_{inLT}$ | inlet temperature of low temperature cooling loop |

[t2]
Command Variables

| | |
|---|---|
| $N_f$ | fan speed |
| $X_v$ | bypass valve position |
| $N_p$ | pump speed |

[t4]
Disturbance Variables

| | |
|---|---|
| $P_n$ | net power |
| $V_v$ | vehicle speed |
| $T_{amb}$ | ambient temperature |
| $N_{fAC}$ | fan speed required from A/C |

All functions can be placed in separate control units with each vehicle system, under a vehicle system controller (VSC) 64, or in various combinations. For the illustrated embodiment, the vehicle including the fuel cell plant is under the control of the VSC 64.

Figure 2:
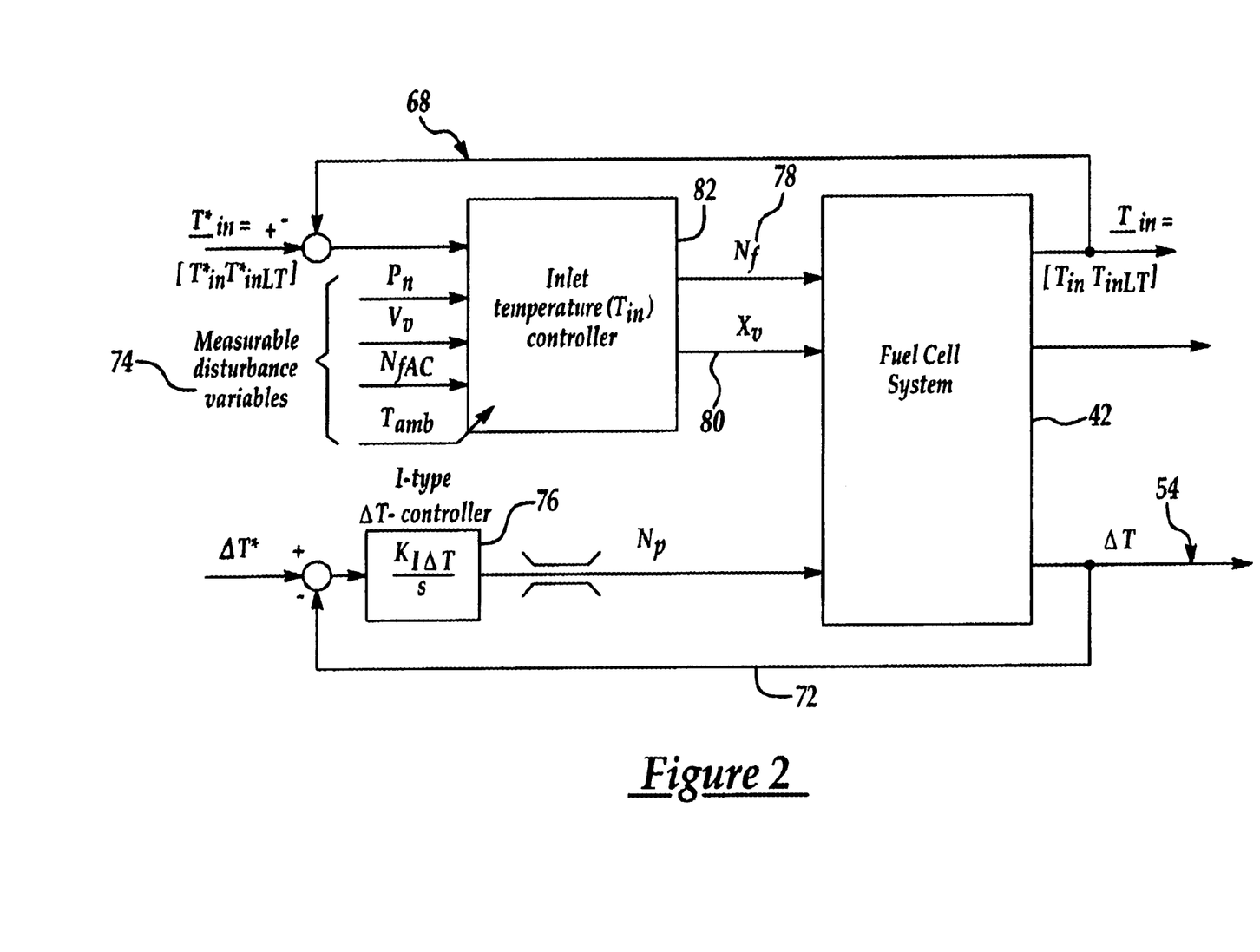
FIG. 2 illustrates a block diagram of a temperature control system of the present invention.

A block diagram of the temperature control system of one possible embodiment of the present invention is illustrated in FIG. 2. Note: in FIG. 2 a vector form for the $T_{in}$–$T_{inLT}$ feedback paths is used and indicated by a thick line 68. Alternatively two lines (not shown) could have been used (scalar form) having two summation elements and two target/output variables. This system consists of three control loops: (1) an inlet temperature control loop for the high temperature cooling loop $T_{in}$ 68, (2) an inlet temperature control loop for the low temperature cooling loop $T_{inLT}$ (included in 68), and (3) a temperature rise across the fuel cell system ($\Delta T$) 54 control loop 72. An inlet temperature controller 82 also receives vehicle input in the form of measurable disturbance variables 74 as described above ($P_n$, $V_v$, $T_{amb}$, and $N_{fAC}$) using various sensors contained within the vehicle to obtain the measurements.

The part of the plant that represents the temperature rise across the fuel cell system ΔT 54 has a very fast time-response that is predominantly determined by the disturbance action of the net power $P_n$. Therefore, a simple integral ΔT controller 76 can be utilized.

The high temperature cooling loop inlet temperature $T_{in}$ 50 is controlled by changing fan 36 speed $N_f$ and the bypass valve 38 position $X_v$. To minimize energy consumption, it is desirable to only change one of these commanded variables at any one time. Namely, the inlet temperature controller 82 can operate either in a fan operating mode 78 ($N_f$ changes, $X_v = X_{v\,max} = 1$) or in a bypass valve operating mode 80($X_v$ changes, $N_{f\,min} = 0$). The present invention can easily accommodate a controller that can operate in both fan operating mode (fan speed) 78 and the bypass valve operating mode, (bypass valve position) 80.

The present invention is the use of an operating mode coordination strategy that can incorporate flip-flop control logic and has a fast response. A controller for the bypass valve 38 is initially utilized to provide temperature control. The valve control is active until the bypass valve 38 reaches a wide open position to allow all coolant flow to pass through the high temperature cooling loop radiator 32. Once the bypass valve 38 is in its full open position, the strategy flip-flops from bypass valve 38 control to fan 36 speed control. The advantage of not allowing fan 36 operation until the bypass valve 38 is fully open is that energy is saved by only operating the fan 36 when it is most effective (i.e., when all the coolant is flowing through the radiator).

A further feature of the present invention can be when the A/C system 62 independently commands increased fan 36 speed for improved A/C condenser 60 performance, the strategy can flip-flop again to the bypass valve 38 control to reduce the flow of coolant through the high temperature cooling loop radiator 32. This allows the fuel cell system 42 to maintain its temperature, even when fan 36 speed is higher than required to accomplish this.

Another general feature of the present invention can be the use of feed forward disturbance compensation. This compensation allows the temperature control system to work faster and more efficiently (a faster response) using input from the measurable disturbance variables 74. For example, the system can detect a requested large increase in net power ($P_n$) from the VSC 64. The strategy will anticipate that this request for large increase in $P_n$ will result in a large heat load. Therefore, the strategy can be configured to, for example, increase fan 36 speed as $P_n$ increases. This feature allows the overall temperature control strategy to reduce temperature spikes (i.e., variance of temperature changes) therefore allowing the plant to operate more frequently within its optimum operating temperature range.

Figure 3:
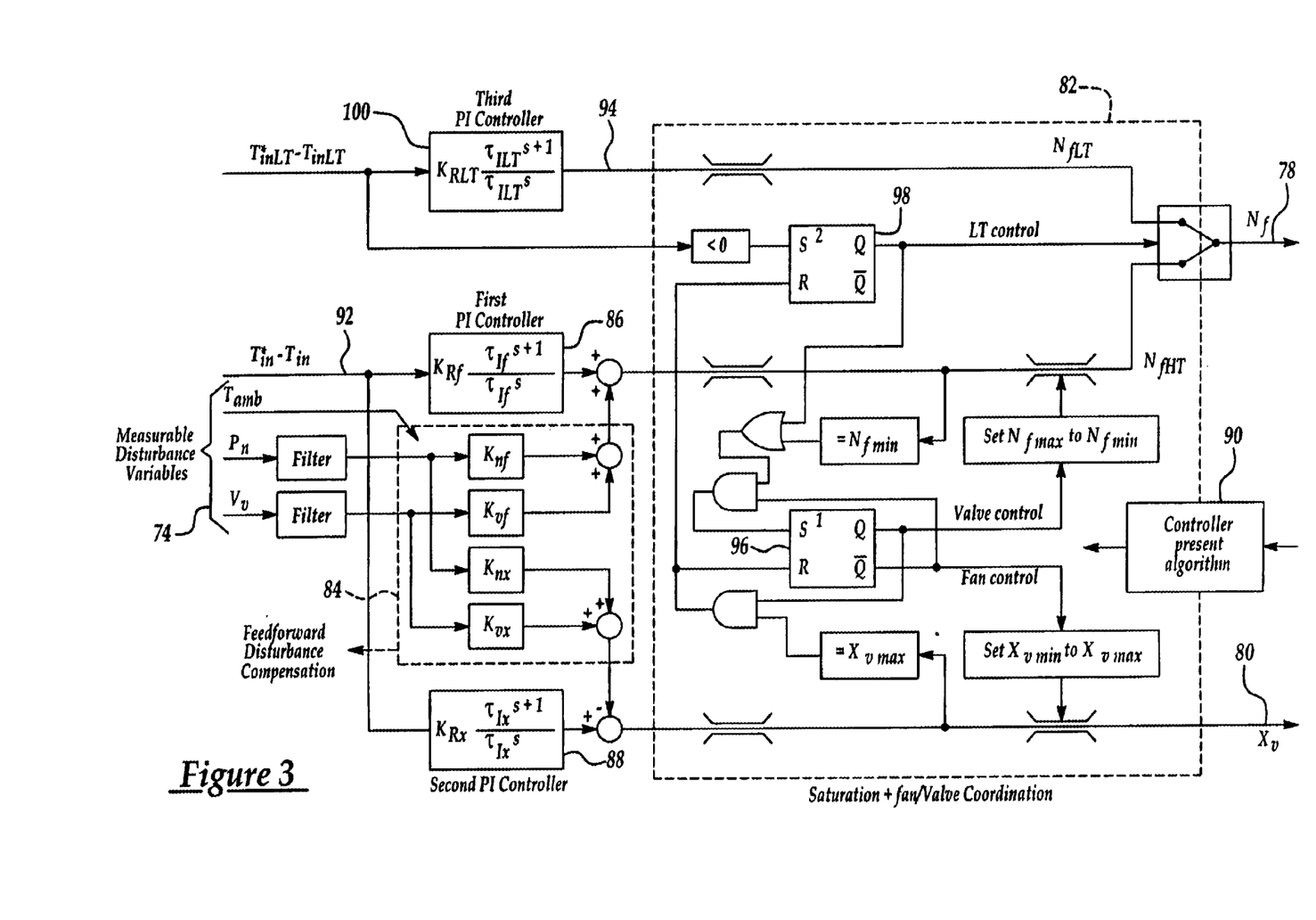
FIG. 3 illustrates a block diagram of an inlet temperature controller of the present invention.

FIG. 3 illustrates one possible configuration of the present invention by way of a block diagram of the inlet temperature controller 82 utilizing features of the present invention. As stated above this controller can be housed within the VSC 64 or a separate controller. This controller generally has feedback controllers 86 and 88, feed-forward disturbance compensation 84, and a fan/valve coordination logic within the inlet temperature controller 82, which includes controller preset actions (algorithm) 90. This description will first describe an inlet temperature controller for the high temperature cooling loop control 92 utilizing a first flip-flop 96 in FIG. 3 (a second flip-flop 98 is reset: Q=0, $N_f = N_{fHT}$) followed by a description in FIG. 3 of an extension of this controller including an additional low temperature cooling loop control 94.

The high temperature cooling loop inlet temperature $T_{in}$ 50 can be controlled by a first proportional integral (PI) controller 86 that controls fan operating mode (fan speed) $N_f$ 78 and a second PI controller 88 that controls the bypass valve operating mode (bypass valve position) $X_v$ 80. In other words, the first PI controller 86 is active in the fan operating mode 78($X_v$32 $X_{v\,max} = 1$), while the second PI controller 88 operates in the valve operating mode 80 ($N_f = N_{f\,min} = 0$). Both first 86 and second 88 PI controllers are coordinated by a first flip-flop logic 96 generally described above.

An advantage of the proposed structure is based on the use of two controllers, first PI controller 86 and second PI controller 88. This differs significantly from prior art single-controller-based split range control structures. Advantages of the two controllers include: (i) the controllers can have different parameters or even structures, so that they can provide better control performance in the general case of significantly different plant models with respect to inputs $N_f$ and $X_v$, and (ii) the overall control algorithm becomes more transparent in the presence of additional controller preset actions and additional $T_{inLT}$-limitation logic.

The high temperature cooling loop 20 plant dynamics contained in the inlet temperature control loop 92 is predominantly determined by a relatively large system time constant (τ) due to a large thermal capacity of the system, and by the coolant transport delay ($\tau_{td}$) which is dependent on the high temperature cooling loop pump 30 speed $N_p$ and is at least 10 times smaller than τ. The first 86 and second 88 PI feedback controllers are utilized, to achieve a fast, well-damped and steady-state-accurate inlet temperature response.

The feed-forward disturbance compensator 84 reacts to a change in measured disturbance variables 74 (such as the net power $P_n$ and the vehicle speed $V_v$) by generating feed-forward commanded signals that are added to the feedback controllers output signals. This compensates for the disturbance action, i.e., leads to decrease of the variance of inlet temperature variations in view of preventing temperature spikes as described above. Based on the insight to the linearized plant model structure, proportional feed-forward actions are adequate to accomplish the present invention. Actually, the feed-forward gains represent an inverse plant dynamics with respect to the disturbance signals $P_n$ and $V_v$. The measured disturbance signals $P_n$ and $V_v$ (especially $P_n$) are filtered, in order to attenuate the transfer of noise from disturbance to commanded signals. Good performance of the feed-forward disturbance compensation 84 for the wide range of ambient air 34 temperatures $T_{amb}$ can be provided by applying feed-forward gain scheduling with respect to measured ambient temperature signal. PI controllers 86 and 88 gain scheduling known in the art may also be convenient.

The fuel cell plant dynamic behavior is different for each of the two inlet temperature controller output variables $N_f$ and $X_v$. Namely, it is necessary to have different feedback and feed-forward controller parameters (or even structures) for the fan and bypass valve operating modes 78 and 80. Ultimately, this is achieved by realization of separate controllers for each operating mode, which are coordinated by a logic algorithm described in FIG. 3.

When the first flip-flop 96 in FIG. 3 is set (Q=1), the bypass valve operating mode 78 is active. The first PI controller 86 in the fan 36 path is disabled by setting its upper limit $N_{f\,max}$ to the lower limit $N_{f\,min}$ (usually 0). If the second PI controller 88 in the bypass valve 38 path requires full opening of the valve ($X_v = X_{v\,max} = 1$), the first flip-flop 96 is reset, i.e. it is switched to the fan operating mode 78 (Q=0). During the fan operating mode 78 period, the bypass valve 38 is fully opened ($X_{vmin}=X_{v\ max}=1$), i.e., the second PI controller 88 in the bypass valve 38 path is disabled. The first flip-flop 96 is switched back to the bypass valve operating mode 80, when the first PI controller 86 in the fan 36 path requires minimum (usually zero) fan 36 speed ($N_f=N_{fmin}=0$). The preset coordination algorithm may be extended by appropriate supervision of the switching logic to avoid frequent switching in the presence of noise. For example, it may be requested that the conditions $N_f=N_{f\ min}$ and $X_v=X_{v\ max}$ need to be satisfied for a certain, relatively short time, before the operating mode is changed.

The coordination logic presented in FIG. 3 illustrates an embodiment of the present invention in the form of a digital circuit. A corresponding algorithm for purposes of software implementation is included in the flowchart diagram shown in FIG. 4. Note that only one of the first PI 86 or second PI controllers 88 is activated at any one time.

Figure 4A:
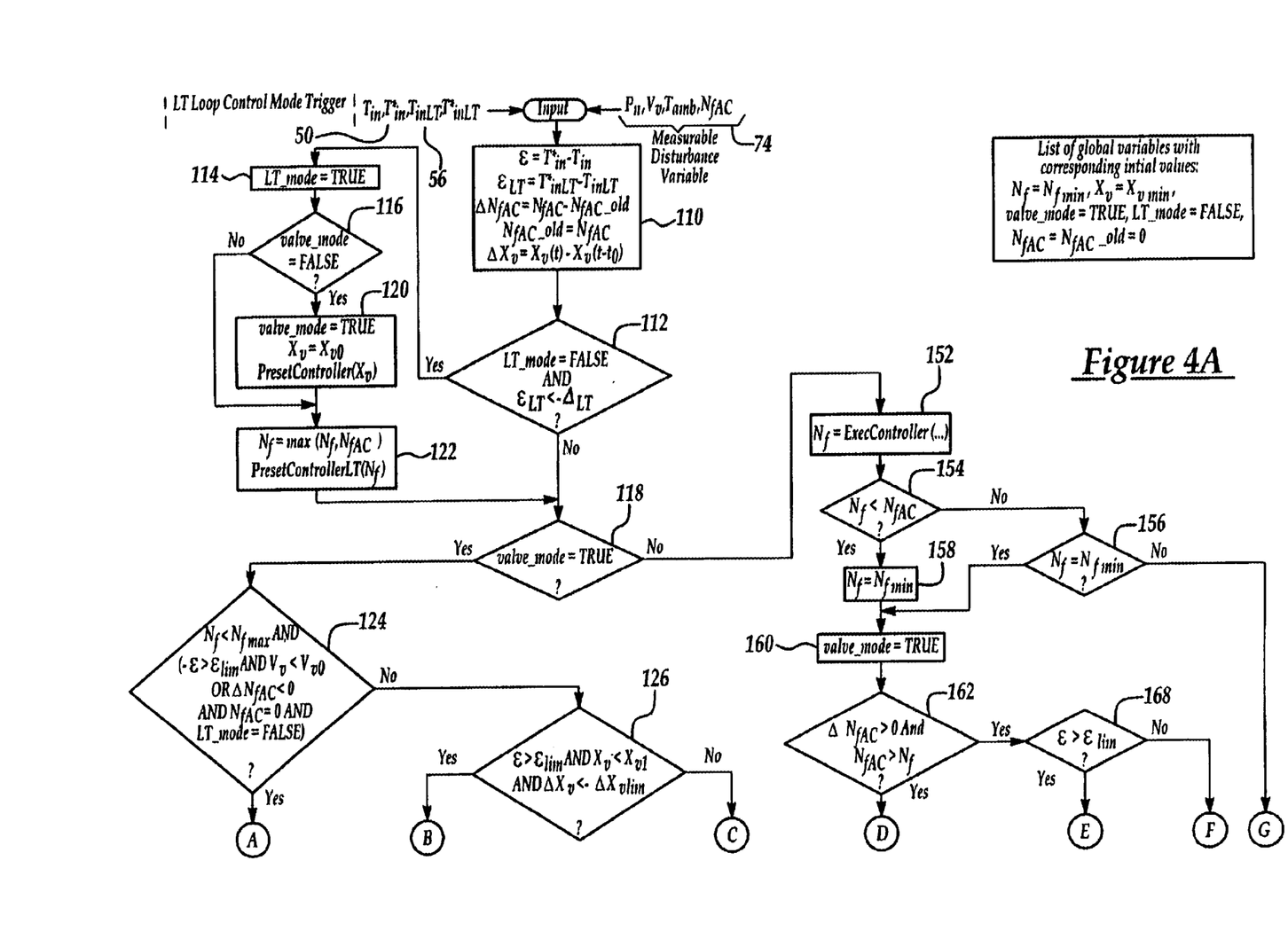
FIG. 4 illustrates a flow chart of the control strategy including controller-preset actions.
Figure 4B:
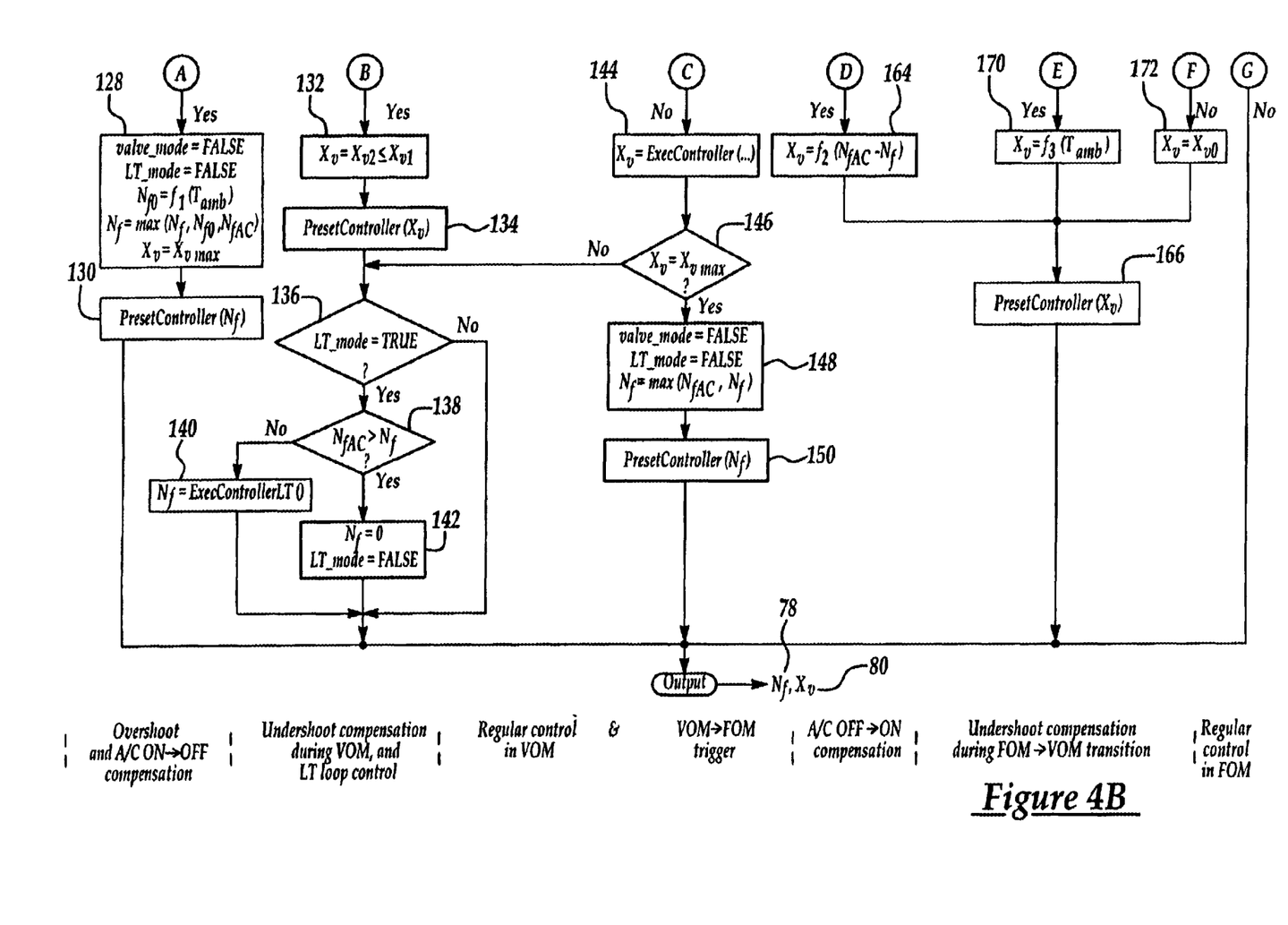

Additional preset actions can be included in the coordination algorithm illustrated in FIG. 4 to compensate for distinct nonlinear plant model effects. They include overshoot compensation, undershoot compensation, and A/C action compensation.

First is overshoot compensation. During a transition from bypass valve operating mode 80 to fan operating mode 78, the fan 36 is turned off. If the vehicle speed $V_v$ is low at the same time, the output heat is also low and $T_{in}$ is practically independent of the bypass valve 38 position $X_v$ ("dead-zone effect"). This implies loss of the plant controllability, and finally results in a large inlet temperature overshoot after transition to the fan operating mode 78. To prevent this, the control algorithm of the present invention can detect an overshoot tendency potential, and command full opening of the bypass valve 38 ($X_v=X_{vmax}=1$) and presetting the fan 36 speed $N_f$ to a value dependent on ambient air 34 temperature ($T_{amb}$). Note that controller output presetting always includes presetting the controller integral term to avoid windup problem.

Second is undershoot compensation. Steady-state analysis of the fuel cell plant model has discovered the presence of a bypass valve 38 insensitivity zone ("dead-zone effect," see above) that occurs approximately between $X_v$ values between 0.5 and 1.0. Here a change of bypass valve 38 position $X_v$ has a relatively small influence on the change of inlet temperature ($T_{in}$). Inside the "dead-zone" the disturbance rejection is inefficient, i.e. the dynamic control error is relatively large. Compensation of the inlet temperature rise (overshoot) is already provided (above). Additionally, inlet temperature drop (undershoot) can be compensated by skipping the "dead-zone" (presetting of $X_v$) after transition to the bypass valve operating mode 80, as well as during the bypass valve operating mode 80 if a control error ($\epsilon$) exceeds the given maximum value ($\epsilon_{lim}$) and $X_v$ is decreasing.

And, third is A/C action compensation. The fan 36 speed stepwise change commanded from the A/C system 62 represents one of the measurable disturbance variables 74 ($N_{fAC}$). This can cause a temporary rise or drop of the inlet temperature of the high temperature cooling loop $T_{in}$ 50. The algorithm can be configured to detect the change of A/C fan 36 speed command $N_{fAC}$, and reacts immediately by changing the operating mode if required (and resetting the controller output value), thus reducing the disturbance influence. In addition, even if $N_{fAC}$=constant, the controller needs to skip the fan 36 control "dead-zone"($N_f<N_{fAC}$) caused by the fan 36 input selector function max ($N_f, N_{fAC}$).

The algorithm of the present invention as illustrated in FIG. 3 generally functions as described above if the low temperature loop inlet temperature ($T_{inLT}$) 56 does not exceed a limit value of 50 degrees Celsius. If the temperature $T_{inLT}$ exceeds the value $T^*_{inLT}$ (set to 50 degrees Celsius, or somewhat lower to avoid overshoot), the second flip-flop 98 as shown in FIG. 3 is set, and activates a low temperature (LT) control mode using a third PI controller 100 ($N_f=N_{fLT}$). This third PI controller 100 adjusts the fan 36 speed with the aim to keep the temperature $T_{inLT}$ at a target (limit) value $T^*_{inLT}\approx50$ degrees Celsius, thus spending a minimum fan 36 power to reach the requirements $T_{inLT}<50$ degrees Celsius. Concurrently, the first flip-flop control 96 switches to the bypass valve operating mode 80, so that the inlet temperature $T_{in}$ for the high temperature cooling loop 20 is controlled by changing the bypass valve 38 position $X_v$. When the commanded bypass valve 38 position reaches its upper limit value ($X_{v\ max}$), the overall strategy determines that temperature $T_{in}$ cannot be controlled by the bypass valve 38. Therefore, additional fan 36 speed needs to be commanded. In this case ($X_v=X_{vmax}$) the first flip-flop 96 is reset, and the fan operating mode 78 is reactivated. Concurrently, the second flip-flop 98 is also reset, thus disabling the low temperature cooling loop control mode ($N_f=N_{fHT}$). Note, the low temperature cooling loop control mode is now unnecessary, because the temperature $T_{inLT}$ will decrease due to fan 36 speed increase. This low temperature cooling loop control mode strategy is included in the overall controller algorithm illustrated in FIG. 4 in sections "LT loop control mode trigger" and "LT loop control" described below.

The parameters of the first 86, second 88, and third 100 PI controllers illustrated in FIG. 3 are determined according to the following simple equations:

$$K_R = \frac{4\zeta^2}{\tau_e}\frac{\tau}{K},$$

and where the ratio $\tau/K$ between system (fuel cell plant) time constant $\tau$ and gain K is determined by plant model linearization, while the closed-loop system equivalent time constant $\tau_e$ and damping ratio $\zeta$ are arbitrarily chosen. The damping ratio $\zeta$ is convenient to set to a value in the range 0.7–1.0 to provide a fast and well-damped control system response. The minimum value of the equivalent time constant $\tau_e$ (i.e., the minimum response time) for a well-damped response is given by:

$$\tau_{emin} = 4\left(\frac{\tau_0}{2} + \tau_{tdmax} + \tau_{actuator} + \tau_{sensor}\right),$$

where $\tau_0$ is the sampling time, $\tau_{td\ max}$ is maximum coolant transport delay, and $\tau_{actuator}$ and $\tau_{sensor}$ are the equivalent time constants of the fan/valve actuator and the temperature sensor, respectively. The case $\zeta=0.7$, $\tau_e=\tau_{e\ min}$ corresponds to the symmetric optimum. Increase of $\tau_{e>\tau_{e\ min}}$ results in decrease of noise sensitivity and control effort.

Similarly, the ΔT-controller integral gain is given by:

$$K_{I\Delta T} = \frac{1}{\tau_{e\Delta z}K_{\Delta T}},$$

$$\tau_{e\Delta T} \geq 2\left(\frac{\tau_0}{2} + \tau_{td\Delta T max} + \tau_{\Delta T actuator} + \tau_{\Delta T sensor}\right).$$

The feed-forward disturbance compensator 84 gains $K_n$ and $K_v$ are determined as the ratios of two characteristic gains of linearized fuel cell plant model: the gains with respect to disturbance variables $P_n$ and $V_v$, and the system gain K (with respect to $N_f$ and $X_v$). These ratios vary with $P_n$ and $V_v$. Approximately minimum values of the ratios are chosen for gains $K_n$ and $K_v$, to avoid an overcompensation effect.

According to the above optimization procedure, the controller parameters are calculated from the parameters of the linearized fuel cell plant model. The final controller tuning is carried out on the real plant.

FIG. 4 illustrates the strategy of the present invention. Specifically, the algorithm outputs fan speed $N_f$ 78 and bypass valve position $X_v$ 80 and are calculated based on actual and target temperatures for $T_{in}$-inlet temperature of high temperature cooling loop 20 and $T_{inLT}$-inlet temperature of low temperature cooling loop 22, and inputs for measurable disturbance variables 74. Initial values can include: fan 36 speed $(N_f)=N_{fmin}$(i.e., the fan 36 speed is set to its lower limit); bypass valve 38 position $(X_v)=X_{vmin}$(i.e., the bypass valve 38 position is closed); valve_mode=TRUE (i.e., the bypass valve control mode 80 is on using second PI controller 88 ); LT_mode=FALSE (i.e.,the low temperature cooling loop controller, third PI controller 100 is off); and the fan 36 speed required from A/C $N_{fAC}=N_{fAC\text{-}old}=0$(i.e., the A/C does not require fan 36 ). The strategy can be divided into following sections: Overshoot and A/C ON→OFF compensation; undershoot compensation during bypass valve operating mode 80 (VOM), and low temperature cooling loop (LT) control; regular control in VOM and a VOM→FOM (valve to fan operating mode 78 ) trigger; A/C OFF→ON compensation; undershoot compensation during FOM→VOM transition; regular control in FOM; and LT_loop control mode trigger.

The strategy begins at step 110 where determinations are made for: $\epsilon$, $\epsilon_{LT}$, $\Delta N_{fAC}$, $N_{fAC\text{-}}$ old, $\Delta X_v$. In this step $\epsilon$ and $\epsilon_{LT}$ are the control errors of the high and low temperature cooling loops 20 and 22 using: $T^*_{in}-T_{in}$ and $T^*_{inLT}-T_{inLT}$ respectively using target and actual values.

The strategy next determines at step 112 whether LT_mode=FALSE and $\epsilon_{LT}<-\Delta_{LT}$. In other words, it determines if the low temperature control loop third PI controller 100 is deactivated and the low temperature loop inlet temperature 56 exceeds its limit value. If no, at step 112 the strategy next makes a determination of whether valve_mode=TRUE at step 118.

If yes at step 112, the strategy commands LT_mode=TRUE at step 114 (i.e., the low temperature cooling loop controller 100 is activated). Next at step 116 the strategy determines if valve_=mode FALSE. If yes, the strategy commands at step 120 for valve_mode=TRUE, and $X_v=X_{v0}$ for Preset Controller ($X_v$). This activates the bypass valve operating mode 80 and presets the bypass valve 38 to its predetermined position to avoid the valve "dead-zone" and proceeds to step 122. If no at step 116, the strategy just proceeds to step 122 (the bypass valve operating mode 80 remains active).

At step 122 the strategy commands $N_f=\max(N_f, N_{fAC})$for preset controller LT($N_f$) to the actual fan 36 speed $N_f$ or to the speed required from A/C $N_{fAC}$ if it is greater than $N_f$. From here the strategy proceeds to step 118.

At step 118 if the determination for valve_mode=TRUE is yes, the strategy proceeds to step 124 to determine if $N_f<N_{fmax}$AND $(-\epsilon>\epsilon_{lim}$ AND $V_v<V_{v0}$ OR $\Delta N_{fAC}<0$ AND $N_{fAC}=0$ AND LT_mode=FALSE). Here the strategy determines if the fan 36 speed is not at its upper limit, and the inlet temperature $T_{in}$ exceeds its upper limit at low vehicle speeds $V_v$(overshoot compensation condition), or A/C commands turning off the fan 36 in the high temperature loop operating mode (A/C ON→OFF compensation condition). If no at step 124, the strategy proceeds to step 126. If yes at step 124, the strategy proceeds to step 128.

At step 128, the strategy commands the valve_mode= FALSE, LT_mode=FALSE, $N_{f0}=f_1(T_{amb})$, $N_f=\max(N_f, N_{f0}, N_{fAC})$, and $X_v=X_{vmax}$. These commands essentially deactivate the bypass valve operating mode 80 and the low temperature cooling loop mode, thus skipping to the fan operating mode 78. Further, they set the bypass valve 38 position $X_v$ to its upper limit $X_{vmax}$, and determine the fan 36 speed to a value $N_{f0}$ which is a function of the ambient air 34 temperature, or to the A/C commanded value $N_{fAC}$ if it is greater than $N_{f0}$. From step 128 the strategy proceeds to step 130 to Preset Controller ($N_f$). From here, the output is sent to the fan 36 and bypass valve 38.

Returning to a no determination at step 124 (no overshoot nor A/C ON→OFF compensation), the strategy proceeds to step 126 where a determination is made as to whether $\epsilon>\epsilon_{lim}$ AND $X_v>X_{v1}$ AND $\Delta X_v<-\Delta X_{vlim}$. Here the strategy determines if the inlet temperature $T_{in}$ exceeds its lower limit, the bypass valve 38 position $X_v$ is greater than some level $X_{v1}$ inside the dead-zone, and the bypass valve 38 position (negative) change is sufficiently large. If yes, the strategy proceeds to steps 132 and 134 and presets the bypass valve 38 controller to a predetermined bypass valve 38 position $X_{v2}<=X_{v1}$ which is around the "dead-zone" lower boundary.

Next the strategy determines whether LT_mode=TRUE at step 136. If no, the strategy output is sent to the fan 36 and bypass valve 38. If yes at step 136, a determination of whether $N_{fAC}>N_f$ is made at step 138. If no, the strategy executes (commands) the LT PI controller 100 ($N_f=$ ExecController LT ( )) at step 140 and its output is sent to the fan 36 and bypass valve 38. If yes, the strategy commands $N_f=0$ and LT_mode=FALSE at step 142 and its output is sent to the fan 36 and bypass valve 38 (Note that the external fan 36 speed selector $\max(N_f, N_{fAC})$ (see FIG. 2) will set $N_f$ to $N_{fmax}$ in this case).

Returning to step 126, if the determination is no (no undershoot compensation), the strategy proceeds to step 144 and executes the bypass valve 38 PI controller 88 ($X_v=$ ExecController( . . . )). From step 144 the strategy proceeds to step 146 and determines whether $X_v=X_{vmax}$, which determines whether the bypass valve 38 is in its maximum open position. If no, the strategy proceeds to step 136 and considers LT loop control as explained above. If yes, the strategy commands valve_mode=FALSE, LT_mode= FALSE, and $N_f=\max(N_{fAC}, N_f)$ at step 148. This deactivates the bypass valve 38 controller and LT PI controller 100, and determines the fan 36 speed preset value $N_f$ as a maximum between actual fan 36 speed value $N_f$ and the value $N_{fAC}$ commanded from A/C. These commands are followed by step 150 that presets the fan 36 speed $N_f$(Preset Controller, ($N_f$)), and the outputs are sent to the fan 36 and bypass valve 38.

Returning to step 118, if the determination is no (the fan operating mode 78 is active) the strategy proceeds to step 152 where $N_f=$ExecController( . . . ) is commanded, which executes the HT fan 36 PI controller 86.

From step 152, the strategy proceeds to step 154 to determine whether $N_f<N_{fAC}$, which means whether the calculated fan 36 speed $N_f$ is lower than the speed $N_{fAC}$ commanded from A/C. If no, the strategy proceeds to step 156 and determines whether $N_f=N_{fmin}$, which means whether the calculated fan 36 speed $N_f$ is at its lower limit value. If yes, the strategy proceeds to step 160 and commands valve_mode=TRUE. At step 156 if the determination is no the output is sent to the fan 36 and bypass valve 38.

After step 160, the strategy proceeds to step 162 and determines whether $\Delta N_{fAC} > 0$ AND $N_{fAC} > N_f$, which means whether A/C commanded a higher A/C speed $N_{fAC}$ which was greater than the calculated fan 36 speed $N_f$. If yes, the strategy determines the bypass valve 38 preset value $X_v = f_2(N_{fAC} - N_f)$ at step 164, which is a function of the difference between A/C-required and calculated fan 36 speed. After step 164, the strategy presets the bypass valve 38 controller (PresetController($X_v$)) in order to compensate for A/C OFF→ON disturbance, and at step 166 the output is sent to the fan 36 and bypass valve 38.

Returning to step 162, if the determination is no (no A/C OFF→ON disturbance), the strategy proceeds to step 168 to determine whether $\epsilon > \epsilon_{lim}$, (i.e., whether the HT inlet temperature $T_{in}$ is below its lower limit). If yes, the strategy determines at step 170 the valve preset value $X_v = f_3(T_{amb})$, which depends on the ambient air 34 temperature and is around the dead-zone boundary. Then the strategy proceeds to step 166. If no at step 168, the strategy sets a lower preset value $X_v = X_{v0}$ at step 172. The strategy then proceeds to step 166, where the bypass valve 38 controller is preset to the previously calculated preset value $X_v$, in order to compensate for undershoot effect during FOM→VOM transition. The output is then sent to the fan 36 and bypass valve 38.

The above-described embodiment of the invention is provided purely for purposes of example. Many other variations, modifications, catalysts, and applications of the invention may be made.

What is claimed is:

1. A temperature control system for a fuel cell vehicle having a fuel cell system and a plurality of electronic components, the fuel cell system and the electronic components each having optimal temperature operating limits, comprising:

sensors to determine temperature of the fuel cell system;

sensors to determine temperature of each of the electronic components;

a cooling system including a high temperature cooling circuit to cool the fuel cell system, and a low temperature cooling circuit to cool the electronic components, the cooling system further including a variable speed fan for cooling coolant flowing in the high and low temperature cooling circuits and a variable position radiator bypass valve for controlling the flow of coolant in the high temperature cooling circuit; and a controller to simultaneously and separately control a high temperature cooling circuit and the low temperature cooling circuit to maintain optimal operating temperature limits of both the fuel cell system and the electronic components, the controller including overshoot and undershoot compensation based on controller preset actions and a logic circuit for coordinating the operation of the fan with the operation of the bypass valve such that fan speed is a function of the operating position of the bypass valve.

2. The system of claim 1, wherein the cooling circuits comprise a variable speed coolant pump to maintain optimal operating temperature limits of the fuel cell system and the electronic components.

3. The system of claim 1, wherein the controller comprises:

a first fast response controller to maintain a coolant at a high temperature coolant circuit fuel cell system inlet to a first predetermined coolant temperature;

a second fast response controller to maintain the coolant temperature difference between a high temperature coolant circuit fuel cell system outlet and the high temperature coolant circuit fuel cell system inlet to a second predetermined coolant value; and a third fast response controller to maintain the coolant temperature within a low temperature coolant circuit to a third predetermined coolant temperature when coolant temperature exceeds the third predetermined temperature.

4. The system of claim 3, wherein the first predetermined fuel cell system inlet coolant temperature is 70 degrees Celsius, +2 degrees.

5. The system of claim 3 wherein the second predetermined coolant value is approximately 10 degrees Celsius.

6. The system of claim 3 wherein the third predetermined coolant temperature is approximately 50 degrees Celsius.

7. The system of claim 3 wherein the fast response controllers are proportional integral controllers.

8. The system of claim 1 wherein the plurality of electronic components comprise auxiliary fuel cell system components, electric drivetrain components, and power management hardware.

9. The system of claim 1 wherein the controller uses feed-forward disturbance compensation to reduce coolant temperature spikes comprising measured signals for fuel cell output power and vehicle speed, and control strategies to reduce coolant temperature dynamic control errors, and control errors caused by a bypass valve dead-zone effect.

10. The strategy of claim 9 wherein the control strategies to reduce coolant temperature dynamic control errors comprise overshoot compensation and undershoot compensation based on controller preset actions.

11. The strategy of claim 9 wherein the feed-forward control strategies comprise a control strategy to measure fuel cell power output and vehicle speed disturbance variables, and vary fan speed or bypass valve position to compensate immediately for the disturbance effect.

12. The system of claim 3 wherein the first fast response controller controls bypass valve position and fan speed, the second fast response controller controls pump speed, and the third fast response controller controls fan speed.

13. The system of claim 12 wherein the first fast response controller controls, in sequence, the bypass valve position until fully opened to deliver coolant to a first radiator, then flip-flops to fan speed control, then flip flops back to bypass valve position control if the commanded fan speed reaches a lower limit or if the third fast response controller is activated when a second radiator inlet temperature exceeds an upper limit.

14. The system of claim 13 further comprising an air-conditioning (A/C) system having an A/C condenser exposed to a cooling airflow, the A/C system using the same fan as the temperature control system, wherein a final fan speed is given by a maximum value of the speeds requested by the control system and the A/C system, wherein the first fast response controller flip flops from fan speed control to bypass valve position control if the A/C system commands the fan speed higher than that of the first fast response controller.

15. A fuel cell powered vehicle comprising:

a fuel cell system serving as a power source;

an electric drive train powered by the fuel cell system;

a plurality of electronic components; and a temperature control system for the fuel cell system and plurality of electronic components, the fuel cell system and the electronic components each having optimal temperature operating limits, the control system including sensors to determine temperature of the fuel cell system, sensors to determine temperature of each of the electronic components, a high temperature cooling circuit to cool the fuel cell system, a low temperature cooling circuit to cool the electronic components, a variable speed fan for cooling coolant flowing in the high and low temperature cooling circuits, a variable position radiator bypass valve for controlling the flow of coolant in the high temperature cooling circuit, and a controller for simultaneously and separately controlling the high and low temperature cooling circuits to maintain optimal operating temperature limits of both the fuel cell system and the electronic components, the controller including overshoot and undershoot compensation based on controller preset action and a logic circuit for coordinating the operation of the fan with the bypass valve such that the speed of the fan is dependent on the operating position of the bypass valve.

16. A method of controlling temperature of a fuel cell system and a plurality of electronic components in a fuel cell vehicle, the fuel cell system and the electronic components each having optimal temperature operating limits, comprising the steps of:

determining temperature of the fuel cell system;

determining temperature of each of the electronic components; and controlling simultaneously and separately a high temperature cooling circuit to cool the fuel cell system and a low temperature cooling circuit to cool the electronic components to maintain optimal operating temperature limits of both the fuel cell system and the electronic components, including overshoot and undershoot compensation based on controller preset actions and controlling the operating position of a variable position bypass valve used to control the flow of coolant in the high temperature cooling circuit, and controlling the speed of a fan used to cool coolant flowing in the high and low temperature cooling circuits based on the operating position of the bypass valve.

17. The method of claim 16, wherein the step of controlling simultaneously and separately the high temperature cooling circuit to cool the fuel cell system and the low temperature cooling circuit to cool the electronic components comprises the steps of:

controlling a first fast response to maintain a coolant at a high temperature coolant circuit fuel cell system inlet to a first predetermined coolant temperature;

controlling a second fast response to maintain the coolant temperature difference between a high temperature coolant circuit fuel cell system outlet and the high temperature coolant circuit fuel cell fuel cell system inlet to a second predetermined coolant value; and controlling a third fast response to maintain the coolant temperature within the low temperature coolant circuit to a third predetermined coolant temperature when coolant temperature exceeds the third predetermined temperature.

18. The method of claim 17, wherein the first predetermined fuel cell system inlet coolant temperature is 70 degrees Celsius, +2 degrees.

19. The method of claim 17 wherein the second predetermined coolant value is approximately 10 degrees Celsius.

20. The method of claim 17 wherein the third predetermined coolant temperature is approximately 50 degrees Celsius.

21. The method of claim 17 wherein the step of controlling fast responses uses proportional integral controllers.

22. The method of claim 16 wherein the plurality of electronic components comprise auxiliary fuel cell system components, electric drivetrain components, and power management hardware.

23. The method of claim 16 wherein the step of controlling simultaneously and separately the cooling circuits comprises the steps of:

compensating feed-forward disturbance to reduce coolant temperature spikes comprising measuring signals for fuel cell output power and vehicle speed; reducing coolant temperature dynamic control errors; and controlling errors caused by a bypass valve dead-zone effect.

24. The method of claim 23 wherein the step of reducing coolant temperature dynamic control errors comprise the steps of overshooting compensation and undershooting compensation based on controller preset actions.

25. The method of claim 23 wherein the step of compensating feed-forward disturbance comprises the steps of measuring fuel cell power output and vehicle speed disturbance variables, and varying fan speed or bypass valve position to compensate immediately for the disturbance effect.

26. The method of claim 17 wherein the first fast response controller controls bypass valve position and fan speed, the second fast response controller controls pump speed, and the third fast response controller controls fan speed.

27. The method of claim 26 wherein the step of controlling a first fast response comprises the steps of controlling, in sequence, the bypass valve position until fully opened to deliver coolant to a first radiator, then flip-flops to controlling fan speed, then flip flops back to controlling bypass valve position if the commanded fan speed reaches a lower limit or if the step of controlling a third fast response is activated when a second radiator inlet temperature exceeds an upper limit.

28. A temperature control system for a fuel cell vehicle having a fuel cell system and a plurality of electronic components, the fuel cell system and the electronic components each having optimal temperature operating limits, comprising:

sensors to determine temperature of the fuel cell system;

sensors to determine temperature of each of the electronic components; and a controller to simultaneously and separately control a high temperature cooling circuit to cool the fuel cell system and a low temperature cooling circuit to cool the electronic components, the controller maintaining optimal operating temperature limits of both the fuel cell system and the electronic components, the controller including (a) a first fast response controller to maintain a coolant at a high temperature coolant circuit fuel cell system inlet to a first predetermined coolant temperature, (b) a second fast response controller to maintain the coolant temperature difference between a high temperature coolant circuit fuel cell system outlet and the high temperature coolant circuit fuel cell system inlet to a second predetermined coolant value, and (c) a third fast response controller to maintain the coolant temperature within a low temperature coolant circuit to a third predetermined coolant temperature when coolant temperature exceeds the third predetermined temperature, wherein the fast response controllers are proportional integral controllers.

29. A temperature control system for a fuel cell vehicle having a fuel cell system and a plurality of electronic components, the fuel cell system and the electronic components each having optimal temperature operating limits, comprising:

sensors to determine temperature of the fuel cell system;

sensors to determine temperature of each of the electronic components; and a controller to simultaneously and separately control a high temperature cooling circuit to cool the fuel cell system and a low temperature cooling circuit to cool the electronic components, the controller maintaining optimal operating temperature limits of both the fuel cell system and the electronic components, the controller using feed-forward disturbance compensation to reduce coolant temperature spikes comprising measured signals for fuel cell output power and vehicle speed, and control strategies to reduce coolant temperature dynamic control errors, and control errors caused by a bypass valve dead-zone effect, the control strategies including overshoot compensation and undershoot compensation based on controller preset actions.

30. The system of claim 25 wherein the feed-forward control strategies comprise a control strategy to measure fuel cell power output and vehicle speed disturbance variables, and vary fan speed or bypass valve position to compensate immediately for the disturbance effect.

31. A temperature control system for a fuel cell vehicle having a fuel cell system and a plurality of electronic components, the fuel cell system and the electronic components each having optimal temperature operating limits, comprising:

sensors to determine temperature of the fuel cell system;

sensors to determine temperature of each of the electronic components; and a controller to simultaneously and separately control a high temperature cooling circuit to cool the fuel cell system and a low temperature cooling circuit to cool the electronic components, the controller maintaining optimal operating temperature limits of both the fuel cell system and the electronic components, the controller including (a) a first fast response controller to maintain a coolant at a high temperature coolant circuit fuel cell system inlet to a first predetermined coolant temperature, and to control bypass valve position and fan speed, the first fast response controller controlling, in sequence, the bypass valve position until fully opened to deliver coolant to a first radiator, then flip-flops to fan speed control, then flip flops back to bypass valve position control if the commanded fan speed reaches a lower limit or if the third fast response controller is activated when a second radiator inlet temperature exceeds an upper limit, (b) a second fast response controller to maintain the coolant temperature difference between a high temperature coolant circuit fuel cell system outlet and the high temperature coolant circuit fuel cell system inlet to a second predetermined coolant value, and to control pump speed, and (c) a third fast response controller to control fan speed and to maintain the coolant temperature within a low temperature coolant circuit to a third predetermined coolant temperature when coolant temperature exceeds the third predetermined temperature.

32. The system of claim 31 further comprising an air-conditioning (A/C) system having an A/C condenser exposed to a cooling airflow, the A/C system using the same fan as the temperature control system, wherein a final fan speed is given by a maximum value of the speeds requested by the control system and the A/C system, wherein the first fast response controller flip flops from fan speed control to bypass valve position control if the A/C system commands the fan speed higher than that of the first fast response controller.

33. A method of controlling temperature of a fuel cell system and a plurality of electronic components in a fuel cell vehicle, the fuel cell system and the electronic components each having optimal temperature operating limits, comprising the steps of:

determining temperature of the fuel cell system;

determining temperature of each of the electronic components; and controlling simultaneously and separately a high temperature cooling circuit to cool the fuel cell system and a low temperature cooling circuit to cool the electronic components to maintain optimal operating temperature limits of both the fuel cell system and the electronic components, the step of controlling the cooling circuits being performed by (a) controlling a first fast response proportional integral controller to maintain a coolant at a high temperature coolant circuit fuel cell system inlet to a first predetermined coolant temperature, (b) controlling a second fast response proportional integral controller to maintain the coolant temperature difference between a high temperature coolant circuit fuel cell system outlet and the high temperature coolant circuit fuel cell fuel cell system inlet to a second predetermined coolant value, and (c) controlling a third fast response proportional integral controller to maintain the coolant temperature within the low temperature coolant circuit to a third predetermined coolant temperature when coolant temperature exceeds the third predetermined temperature.

34. A method of controlling temperature of a fuel cell system and a plurality of electronic components in a fuel cell vehicle, the fuel cell system and the electronic components each having optimal temperature operating limits, comprising the steps of:

determining temperature of the fuel cell system;

determining temperature of each of the electronic components; and controlling simultaneously and separately a high temperature cooling circuit to cool the fuel cell system and a low temperature cooling circuit to cool the electronic components to maintain optimal operating temperature limits of both the fuel cell system and the electronic components, the step of controlling the cooling circuits being performed by (a) compensating feed-forward disturbance to reduce coolant temperature spikes comprising measuring signals for fuel cell output power and vehicle speed, (b) reducing coolant temperature dynamic control errors by overshooting compensation and undershooting compensation based on controller preset actions, and (c) controlling errors caused by a bypass valve dead-zone effect.

35. A method of controlling temperature of a fuel cell system and a plurality of electronic components in a fuel cell vehicle, the fuel cell system and the electronic components each having optimal temperature operating limits, comprising the steps of:

determining temperature of the fuel cell system;

determining temperature of each of the electronic components; and controlling simultaneously and separately a high temperature cooling circuit to cool the fuel cell system and a low temperature cooling circuit to cool the electronic components to maintain optimal operating temperature limits of both the fuel cell system and the electronic components, the step of controlling the cooling circuits being performed by (a) controlling a first fast response controller to maintain a coolant at a high temperature coolant circuit fuel cell system inlet to a first predetermined coolant temperature, (b) controlling a second fast response controller to maintain the coolant temperature difference between a high temperature coolant circuit fuel cell system outlet and the high temperature coolant circuit fuel cell fuel cell system inlet to a second predetermined coolant value, and (c) controlling a third fast response controller to maintain the coolant temperature within the low temperature coolant circuit to a third predetermined coolant temperature when coolant temperature exceeds the third predetermined temperature, wherein the first fast response controller controls bypass valve position and fan speed, the second fast response controller controls pump speed, and the third fast response controller controls fan speed.

36. A temperature control system for a fuel cell vehicle having a fuel cell system and a plurality of electronic components, the fuel cell system and the electronic components each having optimal temperature operating limits, comprising:

sensors to determine temperature of the fuel cell system;

sensors to determine temperature of each of the electronic components; and a controller to simultaneously and separately control a high temperature cooling circuit to cool the fuel cell system and a low temperature cooling circuit to cool the electronic components, the controller maintaining optimal operating temperature limits of both the fuel cell system and the electronic components, the controller including overshoot and undershoot compensation based on controller preset actions for reducing coolant temperature control errors.

37. The system of claim 36, wherein the controller includes:

a first fast response controller to maintain a coolant at a high temperature coolant circuit fuel cell system inlet to a first predetermined coolant temperature, a second fast response controller to maintain the coolant temperature difference between a high temperature coolant circuit fuel cell system outlet and the high temperature coolant circuit fuel cell system inlet to a second predetermined coolant value, and a third fast response controller to maintain the coolant temperature within a low temperature coolant circuit to a third predetermined coolant temperature when coolant temperature exceeds the third predetermined temperature.

38. The system of claim 37, wherein the fast response controllers are proportional integral controllers.

39. The system of claim 37, wherein the first fast response controller controls bypass valve position and fan speed, the second fast response controller controls pump speed, and the third fast response controller controls fan speed.

40. The system of claim 39, wherein the first fast response controller controls, in sequence, the bypass valve position until fully opened to deliver coolant to a first radiator, then flip-flops to fan speed control, then flip flops back to bypass valve position control if the commanded fan speed reaches a lower limit or if the third fast response controller is activated when a second radiator inlet temperature exceeds an upper limit.

41. The system of claim 36, wherein the controller includes feed-forward disturbance compensation for reducing coolant temperature spikes.

42. The system of claim 39, wherein the feed-forward disturbance compensation includes measured signals for fuel cell output power and vehicle speed.

43. A method of controlling temperature of a fuel cell system and a plurality of electronic components in a fuel cell vehicle, the fuel cell system and the electronic components each having optimal temperature operating limits, comprising the steps of:

determining temperature of the fuel cell system;

determining temperature of each of the electronic components; and controlling simultaneously and separately a high temperature cooling circuit to cool the fuel cell system and a low temperature cooling circuit to cool the electronic components to maintain optimal operating temperature limits of both the fuel cell system and the electronic components, the step of controlling the cooling circuits including reducing coolant temperature dynamic control errors by overshooting compensation and undershooting compensation based on present controller actions.

* * * * *